Dec. 26, 1933.   P. H. DAVEY   1,940,940
MOTOR DRIVEN PUMPING APPARATUS
Filed April 9, 1930
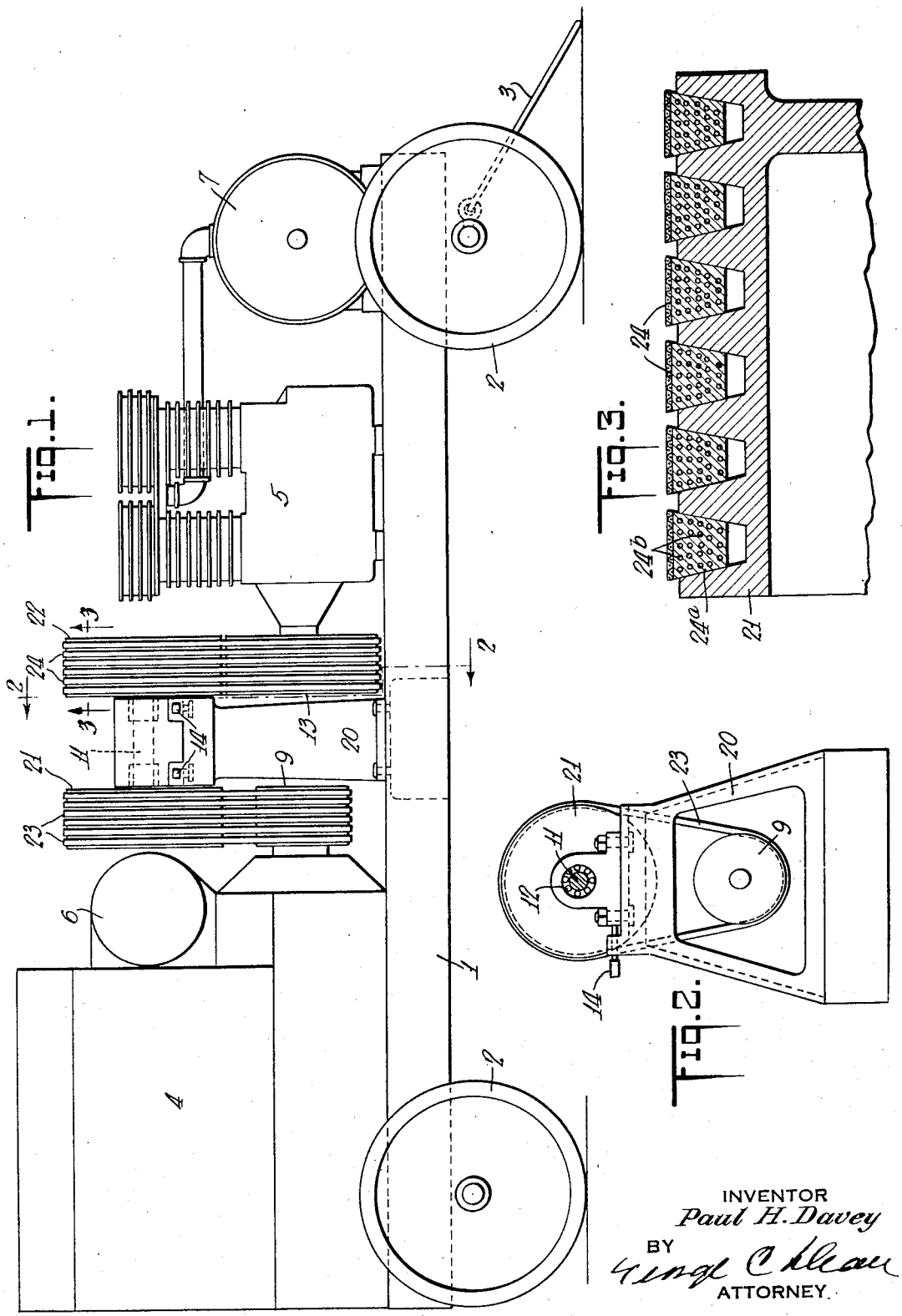
INVENTOR
Paul H. Davey
BY
ATTORNEY.

Patented Dec. 26, 1933

1,940,940

UNITED STATES PATENT OFFICE 1,940,940

MOTOR DRIVEN PUMPING APPARATUS

Paul H. Davey, Kent, Ohio

Application April 9, 1930. Serial No. 442,735

6 Claims. (Cl. 230—33)

My present invention was primarily devised as a solution for certain practical difficulties involved in using an internal combustion engine as a source of power to drive an air compressor where both engine and compressor are mounted on a movable platform, in this case shown as a trailer. However, the main objects of the invention are structural, having to do with compactness and convenience of juxtaposition of the driving and driven unit and functional, as concerns advantageous transmission of the cyclically varying and jerky torque of the internal combustion engine and the still more variable and violently jerky load imposed by the compressor. Consequently, as will hereafter be made more evident, various features of the invention may be of advantage in other connections, as for instance, where the units are not mounted on a truck.

By my invention, the crank shafts of the engine and compressor are preferably in approximate alignment, but they may be parallel and in such case are preferably on the same level, although the invention has the advantage that it permits wide departures from alignment of the driving and driven shafts and even slight departures from parallelism.

Functionally considered, my present invention provides extraordinary effective means for applying the variable torque of the engine through a revolution-reducing, power-multiplying belt connection, the belt connection being of the mutiple, V-belt type, in which the frictional driving stress is applied through the sides of a plurality of V-belts. Such belts are now well known and need not be described further than to note that the variable depth and wedging of the V of the belt into the V of the groove is an important factor of the transmission. By my arrangement, I am able to transmit the power through two sets of belts, doubling the number of V-engagements and interposing a smoothing effect due to inertia of an intermediate set of the V-grooved pulleys keyed to a separate shaft or parallel with the driving and driven shafts. By having the engine driving shaft and the compressor driven shaft in substantial alignment or even when parallel, it becomes a simple matter to adjust the tension of the belts merely by transverse adjustment of the intermediate shaft and its pulleys.

The above and other features of my invention may be more fully understood from the following description in connection with the accompanying drawing, in which Fig. 1 is a view in side elevation of a portable air compressing unit of the type adapted as a trailer for tractors, motor trucks or the like;

Fig. 2 is a detail sectional view taken on the line 2—2 of Fig. 1;

Fig. 3 is a detail transverse sectional view on an enlarged scale taken on the line 3—3 of Fig. 1.

The showing of Fig. 1 is more or less diagrammatic and includes a platform 1, which forms the body of the trailer, having wheels 2 and a suitable traction element 3 by which it may be attached to a tractor, truck or other similar device.

On this platform, preferably parallel with the longitudinal axis thereof, there is an internal combustion motor conventionally indicated at 4 and an air compressor 5. The internal combustion motor 4 and the compressor 5 are preferably so arranged upon the trailer that their crank shafts will be on the same level and approximately in alignment one with the other, and preferably substantially parallel with the longitudinal axis of the trailer. They may, however, be arranged out of alignment with their shafts parallel or substantially so, if desired. The internal combustion motor may have a fuel tank 6 and the compressor, a tank 7, all being of any known or desired construction.

One end of the internal combustion motor crank shaft is provided with a grooved pulley 9 and the adjacent end of the crank shaft of the compressor 5 is provided with a similar pulley 13, except that the pulley 13 is preferably of larger diameter than the pulley 9 for a purpose to be hereinafter described.

Carried by a pedestal or the like 20, there is a countershaft 11 mounted in suitable bearings 12, each end of which projects beyond its respective bearing 12. The countershaft 11, is provided on its projecting ends with pulleys 21 and 22, and said pulleys are preferably of the same diameter as the pulley 13 and therefore of larger diameter than the pulley 9.

The grooves in each of the pulleys 9, 13, 21 and 22 are V-shaped in cross section as illustrated in Fig. 3.

The several parts are so arranged that the grooves in the pulleys 9 will be in substantial alignment with the grooves in the pulley 21, and the grooves in the pulley 13 will be in alignment with those in the pulley 22. Passing around the pulleys 9 and 21, there is a plurality of belts 23. These belts are each approximately wedge-shaped in cross section to laterally fit the converging sides of the groove of the pulley, but they do not completely fill the groove, or at least, they do not extend to the bottom thereof. They are of elastic material 24a and though made with longitudinal cords 24a to limit longitudinal stretching, they have the effect of introducing elasticity in the transmission, to smooth out or cushion the violent abruptness of the explosive motor and air compressor torques, yet without introducing looseness or slip tendency. This results partly from wedging of the belts inward under load, thereby decreasing the radius of the semi-circular paths in which they move. Passing around the pulleys 21 and 22, there are a plurality of belts 23, similar to the belts 24 passing around the pulleys 9 and 21.

Adjustability of the pulleys 21 and 22, relative to the pulleys 9 and 13 to take up slack in the belts, as well as to compensate for inaccuracies in the relative positions of the crank shafts of the internal combustion engine and the compressor is had by movement of the counter-shaft bearings 12. These bearings may be adjustable upon the upper end of the pedestal by screws 14 of which there are preferably two.

By reason of the pulley 9 being smaller than the pulleys 13, 21 and 22, a suitable speed reducing power multiple ratio is obtained. This permits making the three pulleys 13, 22 and 23 of maximum diameter so as to afford maximum flywheel effect.

In order to appreciate the advantages of this arrangement, it will be seen that a single set of pulleys, that is, two pulleys, could be used by raising the level of compressor 5 and shifting it to a position where pulley 13 would be substituted for pulley 21. This, however, would undesirably elevate the compressor and would eliminate the previously described advantages of the intermediate pulleys 21 and 22. In the arrangement shown, pulleys 21 and 22 afford an independent flywheel effect between, in addition to and independent of the flywheel effect of pulleys 9 and 13. Moreover, pulleys 10 and 12 interpose the wedging elasticity effects of two additional sets of the V-grooves, in addition to doubling the length of the belting and its elastic effects.

Obviously the longitudinal elasticity effects of the two sets of belts, one set in advance of and the other set following the steadying inertia or flywheel effect of the pulleys 21, 22, is in no way analogous to the slip effect that can occur between the friction surfaces of a clutch coupling. It has been abundantly proved in practice that the friction clutch will slip when employed between an internal combustion engine and a compressor, and any one familiar with such matters will appreciate that such slip is destructive of the clutch, besides applying undue strains on said engine and said compressor.

By employment of the hereindescribed construction and arrangement of the several parts, the invention provides a smooth application of power from a prime mover such as an internal combustion motor wherein the torque is of a variable and jerky character, to a driven element in which a variable and violently jerky load is imposed upon the prime mover, such for example, as an air compressor. Consequently, as has been abundantly proved in practical use, a friction clutch can be interposed anywhere between the engine and the compressor without possibility of slip and resulting bad effects such as above described. Furthermore, the invention provides for adjustment whereby wear on the several parts may be compensated for and still further provides for the placement of the prime mover and the driven element in relatively close relation, which especially adapts the unit for use as a portable device.

I claim:

1. A motor driven compressor unit including a support having thereon a compressor unit and an internal combustion power unit and an intermediate shaft support in parallelism with the shafts of the power unit and the compressor unit, a multiple V-grooved pulley mounted upon the shaft of the compressor unit, a multiple V-grooved pulley mounted on the shaft of the power unit, a multiple V-grooved pulley mounted on one end of said intermediate shaft, with its grooves in alignment with the grooves of the pulley on the shaft of the power unit, a multiple V-grooved pulley on the opposite end of said shaft with its grooves in alignment with the grooves in the pulley on the shaft of the compressor unit, and two separate sets of V-belts connecting the pulleys on said compressor unit and power unit shafts with their respective pulleys on the intermediate shaft.

2. Apparatus as set forth in claim 1, with the further feature that the intermediate shaft is mounted in bearings that are slidably adjustable at right angles to the axis thereof, transversely to the lengths of the belts.

3. A portable motor and air compressor unit, including a rigid support, an internal combustion engine carried by said support with its crank shaft substantially parallel with said support, an air compressor having its crank shaft also substantially parallel with said support, an intermediate shaft above and parallel with both said crank shafts, two sets of belt pulleys arranged in registering pairs on adjacent ends of said engine and compressor crank shafts and on both ends of said intermediate shaft, each pulley having multiple grooves that are wedge-shaped in cross section, each groove on the intermediate shaft pulleys registering and being in substantially the same plane with a corresponding groove on the engine and compressor shafts respectively, and slightly elastic wedge-shaped belts each fitting the upper portions of said registering grooves of the pulleys.

4. A portable motor and air compressor unit, comprising a wheeled vehicle having a substantial platform between the wheels, an internal combustion engine mounted on said platform with its crank shaft substantially parallel with the length of said vehicle, an air compressor having its crank shaft in substantial alignment with the engine shaft, an intermediate shaft supported above and in substantially the same plane with both said crank shafts, belt pulleys arranged in registering pairs on adjacent ends of said engine and compressor crank shafts and on both ends of said intermediate shaft, each pulley having multiple grooves that are wedge-shaped in cross section, each groove on the intermediate shaft pulleys being registering and in substantially the same plane with a corresponding groove on the engine and compressor shafts respectively, and slightly elastic wedge-shaped belts each fitting the upper portions of said registering grooves of the pulleys, the intermediate shaft being mounted on horizontally adjustable bearings.

5. A motor driven compressor unit, including a support having thereon a reciprocating motor of the type in which there is a crank shaft and a single acting piston actuated by an explosive impulse developing extremely high internal pressures within a small arc of a revolution of the crank shaft, and a reciprocating air compressor of the type in which there is a crank shaft and a single acting piston developing a high pressure peak load during a small arc of a revolution of its crank shaft; said motor and compressor being supported with their crank shafts substantially horizontal and parallel or in alignment, in combination with power transmitting means between said driving and driven shafts interposing serially related flywheel inertia effect and separate elastic coupling effects, said means including a multiple V-grooved pulley mounted upon the shaft of the compressor unit, a multiple V-grooved pulley mounted on the shaft of the power unit, an intermediate shaft arranged in parallelism with the shafts of the power unit and the compressor unit, a multiple V-grooved pulley mounted on one end of said intermediate shaft, with its grooves in alignment with the grooves of the pulley on the shaft of the power unit, a multiple V-grooved pulley on the opposite end of said shaft with its grooves in alignment with the grooves in the pulley on the shaft of the compressor unit, and two separate sets of V-belts connecting the pulleys on said aligned shafts with their respective pulleys on the intermediate shaft.

6. A motor driven compressor unit, including a support having thereon an air compressing pump of the reciprocating type having a flywheel on the crank shaft thereof, an internal combustion engine of the reciprocating type having a flywheel on the crank shaft thereof, and an intermediate rotary power transmitting flywheel element supported with its axis in parallelism with the axes of the engine and compressor crank shafts and with a flywheel element of said power transmission shaft in lateral registry with the flywheel elements of the engine and compressor crank shafts respectively, in combination with means for elastically transmitting power from the periphery of the engine flywheel element to the periphery of a flywheel element of the intermediate power transmitting element and from the periphery of a flywheel element of the latter, to the periphery of the flywheel element of the compressor crank shaft.

PAUL H. DAVEY.